(12) United States Patent
Schiwietz et al.

(10) Patent No.: US 8,125,480 B2
(45) Date of Patent: Feb. 28, 2012

(54) FLAT TEXTURE VOLUME RENDERING

(75) Inventors: Thomas Schiwietz, Plainsboro, NJ (US); Shmuel Aharon, West Windsor, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 399 days.

(21) Appl. No.: 11/401,066

(22) Filed: Apr. 10, 2006

(65) Prior Publication Data

US 2006/0227131 A1    Oct. 12, 2006

Related U.S. Application Data

(60) Provisional application No. 60/670,540, filed on Apr. 12, 2005.

(51) Int. Cl.
*G06T 15/00* (2011.01)
(52) U.S. Cl. ......................................................... 345/419
(58) Field of Classification Search .................... None
See application file for complete search history.

(56) References Cited

U.S. PATENT DOCUMENTS

| | | | | |
|---|---|---|---|---|
| 4,586,038 | A * | 4/1986 | Sims et al. | 345/586 |
| 5,831,623 | A * | 11/1998 | Negishi et al. | 345/424 |
| 6,549,200 | B1 * | 4/2003 | Mortlock et al. | 345/419 |
| 6,606,089 | B1 * | 8/2003 | Margadant | 345/419 |
| 6,831,656 | B2 * | 12/2004 | Kitao | 345/582 |
| 6,952,207 | B1 * | 10/2005 | Santodomingo et al. | 345/428 |
| 2005/0243094 | A1 * | 11/2005 | Patel et al. | 345/506 |

OTHER PUBLICATIONS

Wilson et al. "Direct Volume Rendering Via 3D Textures," 1994.
Weiskopf et al, "Real-Time Advection and Volumetric Illumination for the Viusalization of 3D Unsteady Flow," Eurographics— IDDD VGTC Symposium on Visualization (2005).
Harris, MJ, "Real Time Cloud Simulation and Rendering," Dissertation submitted to the faculty of the University of North Carolina, 2003.
Lefohn et al., "Interactive Deformation and Visualization of Level Set Surfaces Using Graphics Hardware," IEEE Visualization, pp. 75-82, 2003.

* cited by examiner

*Primary Examiner* — Said Broome
(74) *Attorney, Agent, or Firm* — Donald B. Paschburg (57) ABSTRACT

A GPU accelerated volume rendering method from flat textures (also known as texture atlas) is disclosed. The method is not restricted to a specific rendering technique. The method is fast as it requires no reordering or copying passes. An image processing system is also provided. Addressing of two dimensional flat textures is accomplished based on the viewing direction. A first addressing scheme is used for the x direction, a second addressing scheme is used for the y direction and a third addressing scheme is used for the z direction, where x, y, and z refer to the axes of Cartesian coordinate system.

21 Claims, 6 Drawing Sheets

FLAT TEXTURE VOLUME RENDERING

STATEMENT OF RELATED CASE

This application claims the benefit of U.S. Provisional Application Ser. No. 60/670,540, filed Apr. 12, 2005, which is incorporated by reference herein in its entirety.

BACKGROUND OF THE INVENTION

This invention relates to a volume rendering method which projects an image provided by three-dimensional volumetric data on a two-dimensional plane. Volume rendering is an important technique for visualizing and analyzing three-dimensional data. It is widely used in for instance medical applications for visualizing data that have been obtained by for instance MRI and CT methods. For the visualization to be effective, it is essential to be able to perform the volume rendering in interactive rates. The rendering methods are usually performed by a processor such as a dedicated Graphical Processing Unit (GPU). For most common hardware-accelerated volume rendering techniques the data has to be stored in graphics memory as a 3D texture. Unfortunately there is no efficient way to update volumetric data on the GPU as needed for GPU-based algorithms. Although the new OpenGL frame buffer object extension allows rendering to slices of a volume, the current drivers do not provide an efficient implementation. The rendering methods have to be performed within the constraints (such as execution speed of instructions) of the GPU. Accordingly, efficient implementation of volume rendering techniques on the Graphical Processing Unit (GPU) is required.

SUMMARY OF THE INVENTION

The present invention, in accordance with one aspect, provides a method of processing a set of three dimensional image data. The set of three dimensional image data is represented in flat two dimensional texture data. The steps include addressing the set of flat two dimensional texture data based on a direction of viewing the three dimensional image data and rendering an image from the set of flat two dimensional texture data using the results of the addressing step.

In accordance with another aspect of the present invention, the steps of addressing and rendering are performed at the same time. They can also be performed at different times.

In accordance with a further aspect of the present invention, the steps of addressing and rendering are performed in a graphics processing unit. In a preferred embodiment, a pixel shader in the graphics processing unit is used to perform the steps of addressing and rendering.

In accordance with another aspect of the invention, a first addressing scheme of the set of flat two dimensional texture data is used when viewing the three dimensional image data from a x direction, a second addressing scheme of the set of flat two dimensional texture data is used when viewing the three dimensional image data from a y direction and a third addressing scheme of the set of flat two dimensional texture data is used when viewing the three dimensional image data from a z direction, where x, y, and z refer to the axes of a Cartesian coordinate system.

The addressing schemes thus depend on the direction of viewing. When viewing from the x direction, a slice is reconstructed by reading data elements of a column of the set of flat two dimensional texture data and the column index is determined by a u-component of 3D coordinates (u,v,w). When viewing from the y direction, a slice is reconstructed by reading data elements of a row of the set of flat two dimensional texture and the row index is determined by the v-component of 3D coordinates (u,v,w). When viewing from the z direction, a slice is reconstructed from the set of flat two dimensional texture directly by (u,v).

In accordance with a further aspect of the present invention, a system including a processor and software operable on the processor to perform the previously stated tasks is provided.

A method of processing a set of image data, the set of image data being represented in a flat two dimensional texture, is also provided. The method includes the steps of addressing the set of image data based on a viewing direction and calculating view aligned slices from the flat two dimensional textures using the results of the addressing step.

These steps can be performed in a graphics processing unit and in particular in a pixel shader in the graphics processing unit.

The present invention also provides a method of processing a set of image data, the set of image data being represented in a flat two dimensional texture, including the steps of addressing the set of image data based on a viewing direction and rendering an image from the set of image data using ray casting.

These steps can also be performed in a graphics processing unit and in particular in a pixel shader in the graphics processing unit.

DESCRIPTION OF A PREFERRED EMBODIMENT

Progressive volume visualization is often desired for successively updated data such as in medical imaging. For example, visualizing iterative 3D simulation algorithms provide better understanding of the simulation process. Furthermore, detection of cases where the simulation does not progress into the desired direction can be detected early.

As GPU-accelerated algorithms become more and more popular, rendering GPU-updated data is necessary to achieve interactive frame rates. For most common hardware-accelerated volume rendering techniques the data has to be stored in graphics memory as a 3D texture. Unfortunately there is no efficient way to update volumetric data on the GPU as needed for GPU-based algorithms. Although the new OpenGL frame buffer object extension (as provided in OpenGL. frame buffer objects. http://www.opengl.org/documentation/extensions/ EXT_framebuffer_object.txt) sallows rendering to slices of a volume, the current drivers do not provide an efficient implementation.

Figure 1:
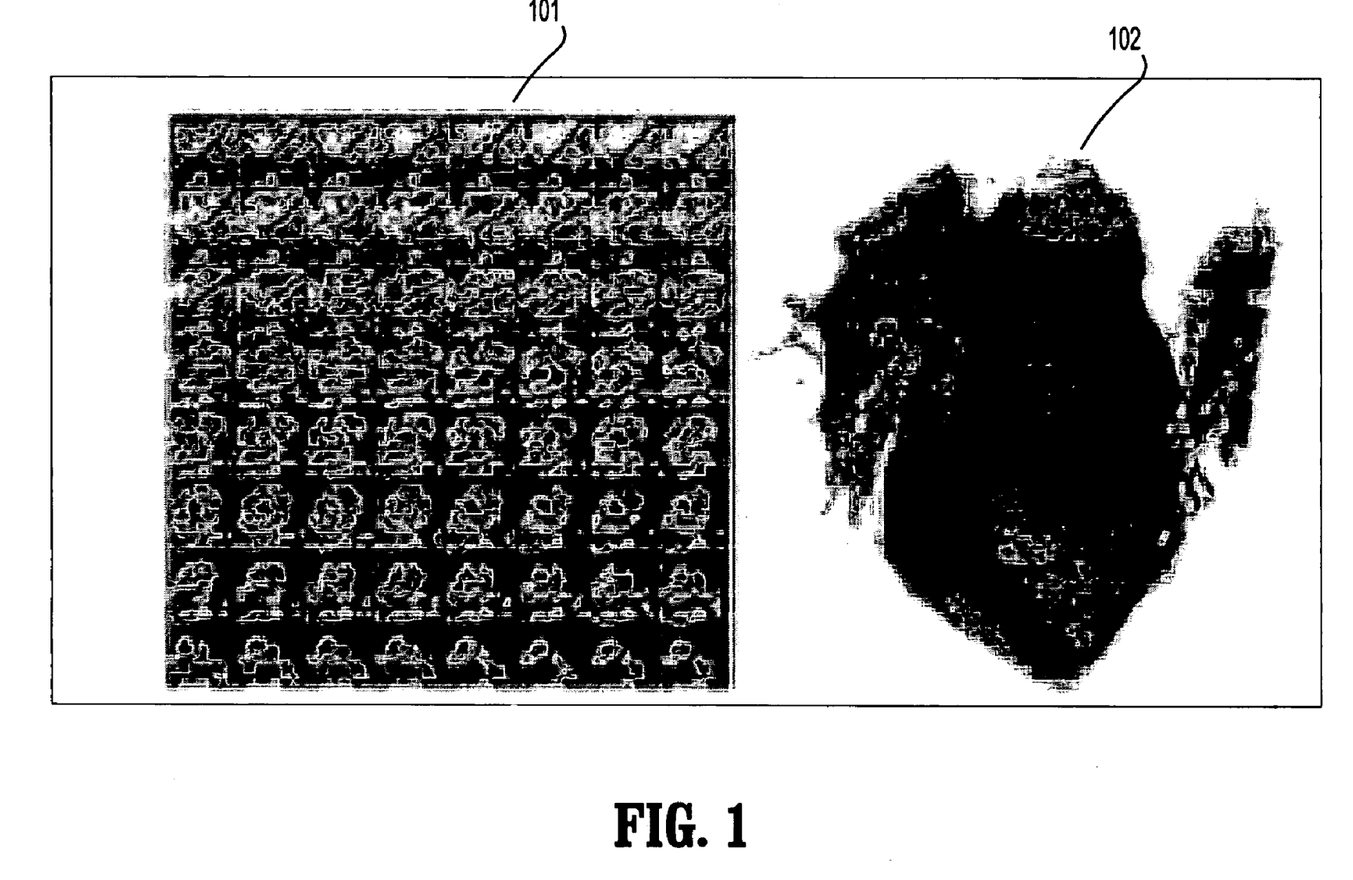
FIG. 1 illustrates a flat texture in 2D coordinate space of a 3D volume.

Instead of using 3D textures the volumetric data can be stored in a flat texture as described by Harris et al in Mark J. Harris, William V. Baxter, Thorsten Scheuermann, and Anselmo Lastra. Simulation of cloud dynamics on graphics hardware. In *HWWS '03: Proceedings of the ACM SIG-GRAPH/EUROGRAPHICS conference on Graphics hardware*, pages 92-101, Aire-la-Ville, Switzerland, Switzerland, 2003. Eurographics Association. The slices are arranged side-by-side in one large texture like shown in FIG. 1. A slice in the flat texture will be called a tile. FIG. 1 shows in 101 a flat texture of a $64^3$ heart data set (of which a representation is shown in 102), where eight slices are stored in one row of tiles. The total flat texture size is $512^2$. For $128^3$ volumes we store the slices in a 2048×1024 flat texture. Updating large 2D textures is very fast on current graphics hardware.

Copying the flat texture to a 3D texture is not desirable, because the flat texture had to be downloaded to main memory and re-uploaded as 3D texture. Due to the slow bus transfer between main memory and graphics memory this is not acceptable for interactive applications.

The present invention provides a novel approach to render 3D data sets from flat textures directly without data copying or reordering. The mapping method which is an aspect of the present invention is independent from the specific volume rendering technique which is used. This allows us to have progressive volume visualization of successively updated data.

To put the novel methods in context first, related flat texture approaches are discussed. Then, three common hardware-accelerated volume rendering techniques are revisited and enhanced by the novel flat texture mapping. Specifically, these techniques are axis-aligned and view-aligned slice-based volume rendering as well as ray casting.

The benefits of flat texturing for the simulation of clouds on the GPU were shown by Harris et al. in Mark J. Harris, William V. Baxter, Thorsten Scheuermann, and Anselmo Lastra. Simulation of cloud dynamics on graphics hardware. In *HWWS '03: Proceedings of the ACM SIGGRAPH/EUROGRAPHICS conference on Graphics hardware*, pages 92-101, Aire-la-Ville, Switzerland, Switzerland, 2003. Eurographics Association. For displaying the results the author suggests rendering the flat texture directly. That is, showing all slices at once, as shown in FIG. 1. Volume rendering is not considered in that article. The process of translating different slices into one representation comprising all slices as tiles is shown in diagram in FIG. 2. Herein 4 consecutive slices as shown in 201 are mapped into 2×2 tiles of one single large tile (202).

Volume rendering techniques from flat textures were described by Lefohn et al. in Aaron Lefohn, Joe M. Kniss, Charles D. Hansen, and Ross T. Whitaker. Interactive deformation and visualization of level set surfaces using graphics hardware. In *Proceedings of IEEE Visualization* 2003, pages 75-82, 2003. and Weiskopf et al. in D. Weiskopf, T. Schafhitzel, and T. Ertl. Real-Time Advection and Volumetric Illumination for the Visualization of 3D Unsteady Flow. In *Proceedings of EG/IEEE TCVG Symposium on Visualization Eurovis '05*, 2005. Both approaches are restricted to axis-aligned slice-based volume rendering, where rendering primitives are orientated along the major viewing axis.

Figure 2:
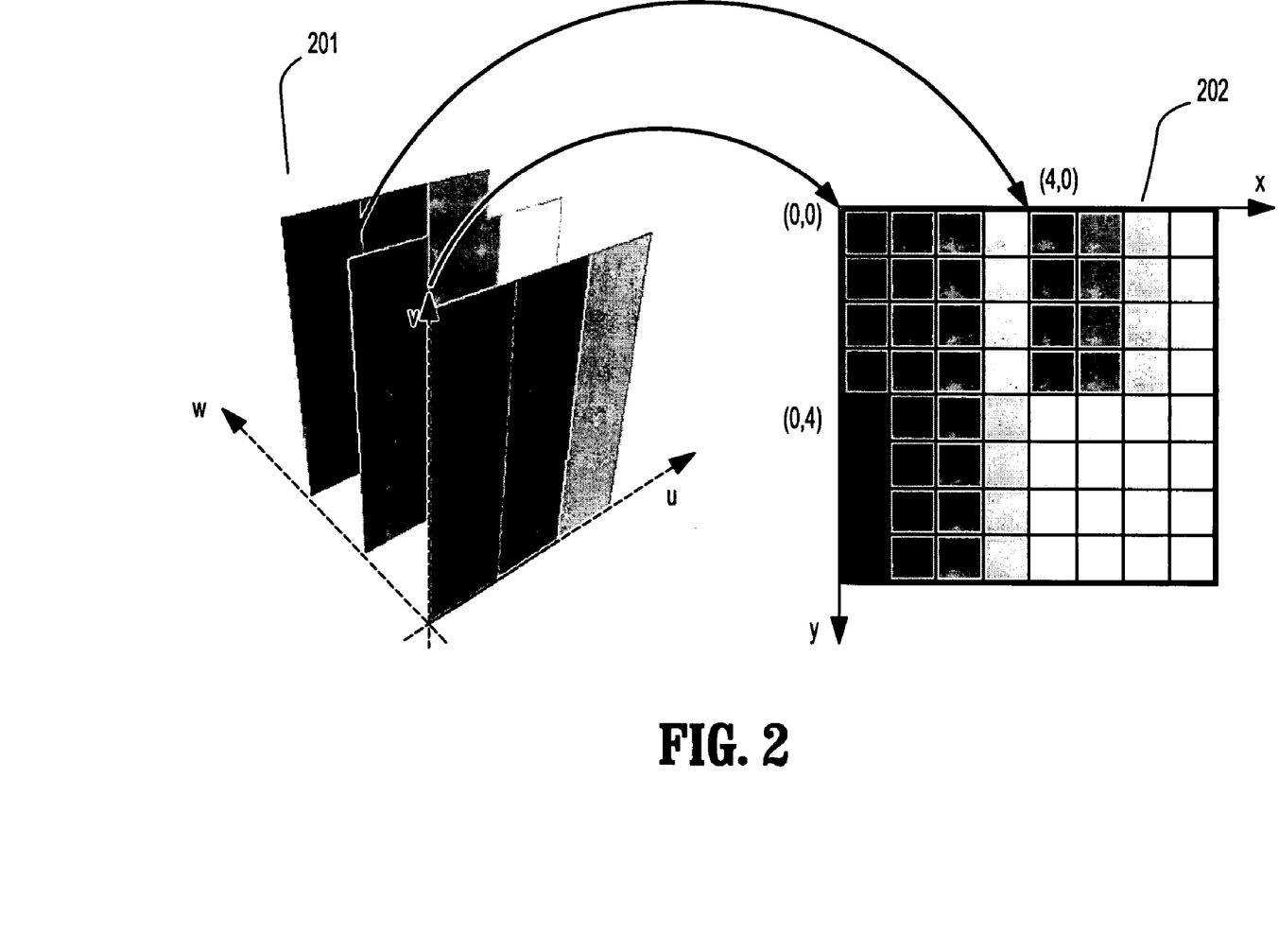
FIG. 2 illustrates a process performed in accordance with one aspect of the present invention.

Depending on the major viewing axis in earlier cited Lefohn et al. suggests rendering different types of primitives. When viewing down the z-axis, quadrilaterals with mapped tiles of the flat texture are rendered. When looking down the x- or y-axis, the mapping gets more complicated. Line primitives are rendered as shown in FIG. 2. In axis-aligned slice-based volume rendering each of the three major viewing axes requires different access patterns to the flat texture. The image illustrates the reconstruction of the first slice along each major axis, wherein image 201 shows reconstruction along the x-axis, 202 along the y-axis and 203 along the z-axis. Each quadrilateral is put together by N lines in a $N^3$ volume, which is not efficient because of the large number of render calls. Bilinear filtering is not possible anymore, because neighboring voxels are not necessarily neighbors in the flat texture. The rendering of lines might also introduce gap artifacts when zooming in the volume, if the line thickness does not cover all pixels in the output image.

The earlier cited article of Weiskopf et al overcame this problem by reordering the flat texture whenever the major viewing axis changes. During rendering the flat texture access patterns are very simple, as only tiles are addressed. Bilinear interpolation is also possible with restriction on the borders of each tile. For successively updated data on a flat texture this approach requires an additional reordering pass per frame when looking down the x- or y-axis. However, this method is also restricted to axis-aligned volume rendering.

A second article by Lefohn et al. being Aaron Lefohn, Joe M. Kniss, and John D. Owens. *Implementing Efficient Parallel Parallel Structures on GPUs*, pages 521-545. Addison-Wesley, 3 2005. describes the mapping from 3D volume coordinates to 2D flat texture coordinates. An article in the same book, by Kniss in Joe M. Kniss, Aaron Lefohn, and Nathaniel Fout. *Implementing Efficient Parallel Data Structures on GPUs*, pages 667-674. Addison-Wesley, 3 2005. describes deferred filtering methods in "difficult" data structures like flat textures by reconstructing axis-aligned slices for volume rendering.

We will now present a novel solution to flat texture volume rendering that is not restricted to a specific rendering technique and requires no reordering or copying passes. We will provide the mapping from 3D volume coordinates to 2D flat texture coordinates and provide examples of common hardware-accelerated volume rendering techniques modified to render from flat textures.

As 3D coordinates are used in common volume rendering techniques to address voxels in a volume, a mapping from 3D coordinates to flat 2D coordinates is required. Such a mapping has been published by Lefohn et al. in the earlier cited second article. The w-component of 3D coordinates (u,v,w) is de-linearized to a (x,y) tile starting offset in the flat texture assuming un-normalized (u,v,w)-components in the range between [0, N−1].

$$x = w \bmod t, \quad (1)$$
$$y = \mathrm{floor}\left(\frac{w}{t}\right),$$

where t is the number of tiles in one row of the flat texture. FIG. 2 illustrates the mapping.

The (u,v)-components are the local coordinates within the tile. Adding the tile offset to the local tile coordinates gives the address to a pixel in the flat texture. The following source code shows the mapping in HLSL.

```
// variable inputs: TexCoords.xyz (uvw-components)
// uniform inputs: Tiles (number of tiles per row)
// compute flat slice offset
float2 tileOffset;
modf(TexCoords.z % Tiles, tileOffset.x);
tileOffset.y = floor(TexCoords.z/Tiles);
// add local slice coordinates
float2 flatAddress = tileOffset + Texcoords.xy;
```

Note that the texture coordinates might have to be normalized afterwards, depending on the API. The calculation of the tile offset can either be computed on the GPU directly or pre-computed in a look-up table stored as 1D texture.

Axis-Aligned Slice-Based Volume Rendering

Figure 3:
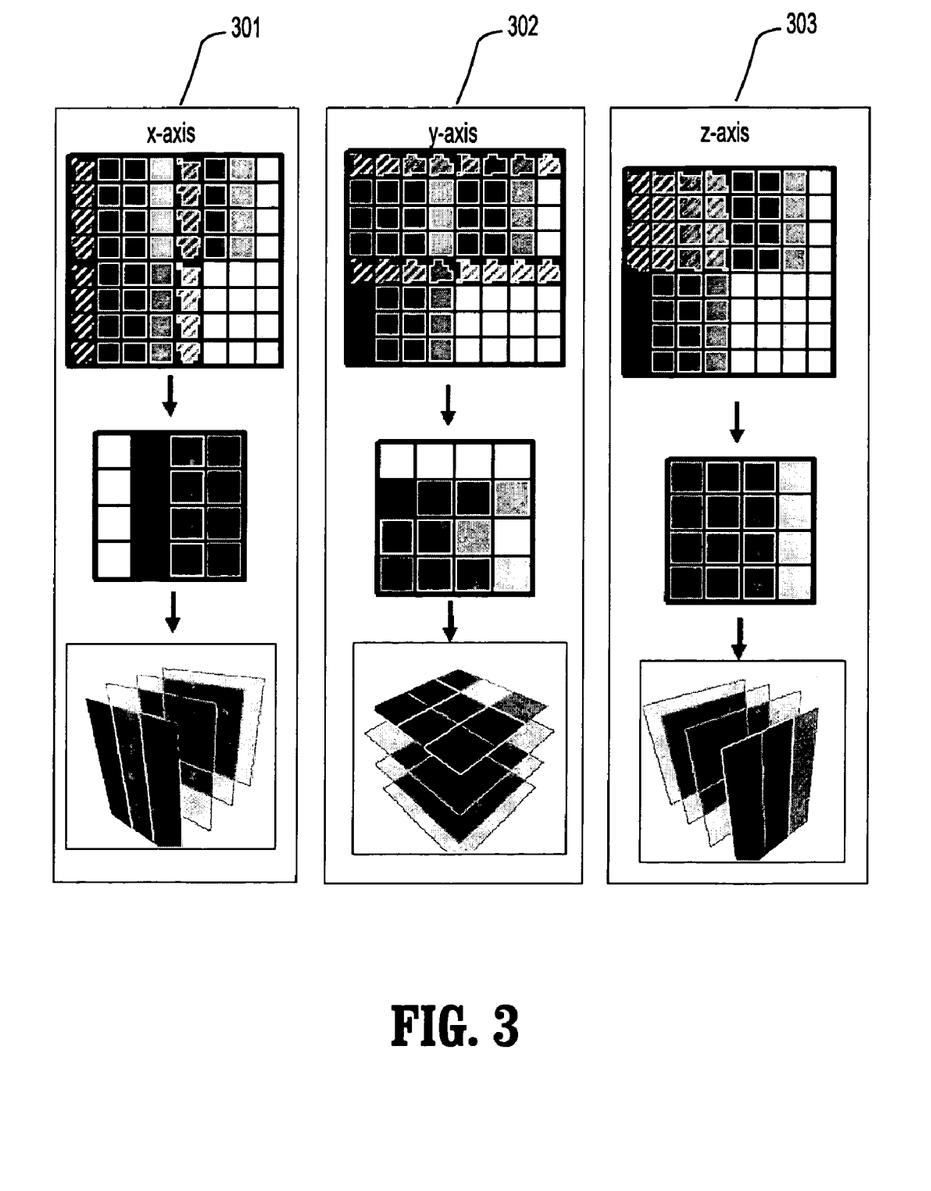
FIG. 3 illustrates slice reconstruction in axis-aligned mode.

Quadrilaterals are aligned to the major viewing axis. There is a characteristic flat texture access pattern for each of the three major axes as depicted in FIG. 3.

1. When looking down the x-axis, each slice is reconstructed by reading the same column of all slices in the flat texture. The column index is determined by the u-component of the 3D coordinates.
2. When looking down the y-axis, each slice is reconstructed by reading the same row of all slices in the flat texture. The row index is determined by the v-component of the 3D coordinates.
3. Looking down the z-axis, tiles can be mapped in the flat texture directly.

We use quadrilateral primitives to render all three viewing axis and let the pixel shader do the mapping to the flat texture according to the major viewing axis. The CPU sets up texture coordinates (u,v,w) in the shaders for each quadrilateral. For the z-axis the CPU passes scaled and shifted texture coordinates of the current tile to the shader program. No mapping has to be done on the GPU.

Figure 4:
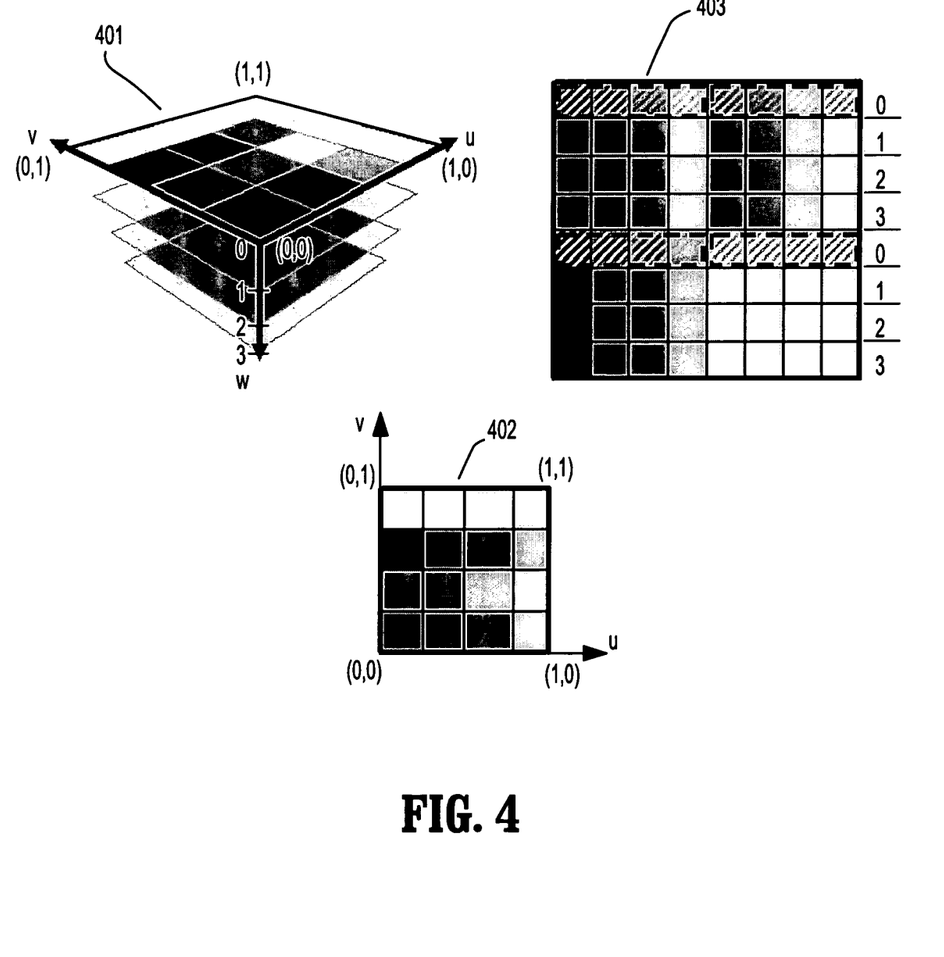
FIG. 4 illustrates 3D coordinate mapping in accordance with an aspect of the present invention.

The x- and y-axis require the mapping shown in equation (1). We explain the y-axis mapping in this section. The x-axis mapping is obtained by rotating the axes. As depicted in FIG. 4, the v-component selects the tile that a row is read from. Within the tile local coordinates (u,w) address a pixel in the flat texture. Here, the w-component selects the row and the u-component the pixel within the row. Note that w is constant in each quadrilateral. FIG. 4 shows as an illustrative example the mapping the 3D (u,v,w) coordinate to the flat texture when viewing along y-axis. Image 401 shows the stack of slices or tiles. The v-component selects the tile 402, and (u,w) is the local coordinate of the pixel within in the tile. The location of a pixel in the combination of tiles is shown in 403.

View-Aligned Slice-Based Volume Rendering

Figure 5:
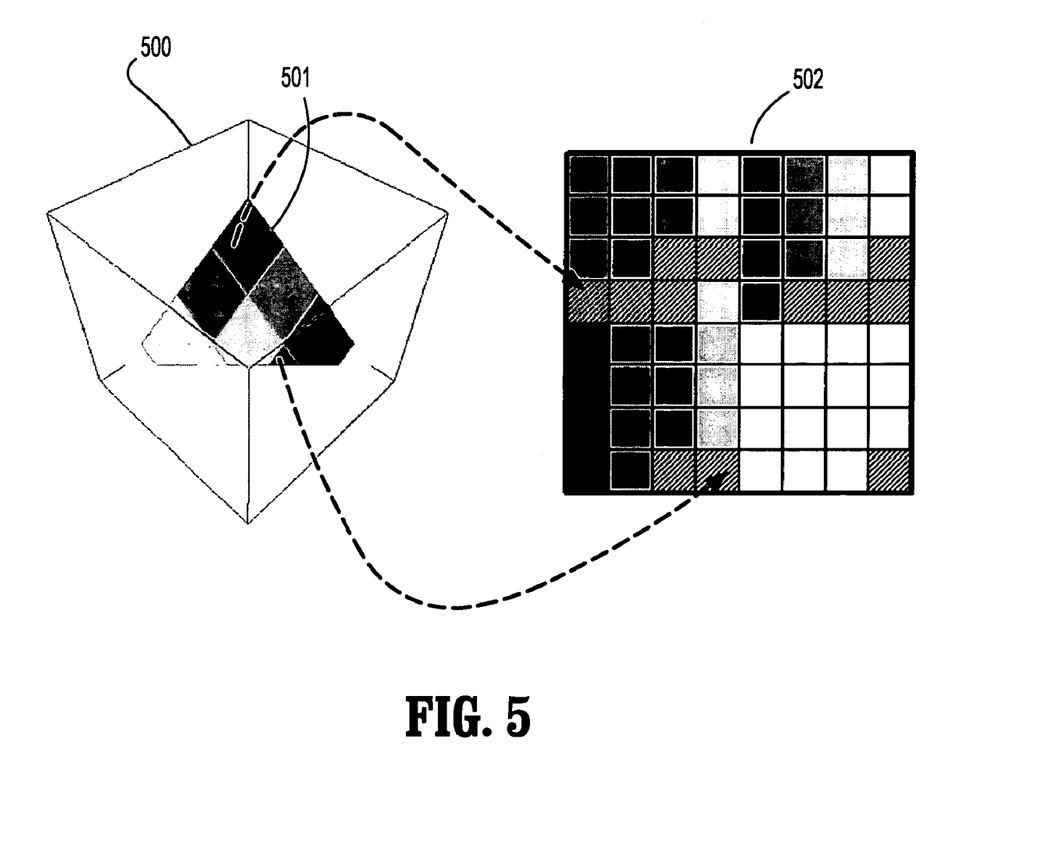
FIG. 5 illustrates coordinate mapping in view aligned rendering in accordance with an aspect of the present invention.

There are no different axes to distinguish in view-aligned slice-based volume rendering. The 3D coordinates (u,v,w) are mapped using equation (1) implemented in a pixel shader program with the w-component as tile index. The texture access pattern follows no regular pattern anymore as illustrated in FIG. 5. The figure shows only one view-aligned slice in the middle of the volume. The same sample volume as in FIG. 4 rendered with view-aligned slices of which 501 is an example. Mapping 501 into the flat texture 502 follows no specific pattern any more. Only one view-aligned slice 501 in the middle of the volume 500 is shown. The accessed pixels in the flat texture 502 are striped.

Although the flat texture access patterns are irregular, the rendering speed is almost constant from all viewing directions for small volumes. Apart from better image quality, the view-aligned renderer has a constant performance from all viewing directions while the performance of the axis-aligned renderer is dependent on the viewing direction. Performance along z-axis is about twice as fast, since no mapping has to be computed.

Ray Casting

GPU accelerated ray casting has been described in Jens Krueger and Ruediger Westermann: Acceleration techniques for GPU-based volume rendering. See, In *Proceedings IEEE Visualization* 2003, 2003. The idea is to assign 3D texture coordinates to the corners of a unit cube. The unit cube is rotated according to the current model-view matrix. Rendering the front-facing quadrilaterals of the cube computes all ray entry points to the volume, which is stored in a texture. Rendering the back-facing quadrilaterals computes all ray exit points. Subtracting the former from the latter, one returns the ray direction for each pixel.

In a loop all rays are casted through the volume by adding a ray delta along the ray direction to the entry points. This step is done in a shader program. The updated ray position is a 3D coordinate, which is mapped to flat texture coordinates.

Timings

Table 1: Comparison of frame rates on an ATI Radeon X800 XT for axis-aligned and view-aligned slice-based volume rendering.

| Radeon X800 XT | 3D texture | | 3D texture & flat texture | |
|---|---|---|---|---|
| view axis | x/y | z | x/y | z |
| Axis-aligned $64^3$ | 160 | 230 | 108 | 187 |
| View-aligned $64^3$ | 168 | 233 | 103 | 103 |
| Axis-aligned $128^3$ | 62 | 111 | 32 | 80 |
| View-aligned $128^3$ | 63 | 116 | 32 | 52 |

Table 2: Comparison of frame rates on an NVIDIA Geforce 6800 GT for axis-aligned and view-aligned slice-based volume rendering.

| Geforce 6800 GT | 3D texture | 3D texture & flat texture | |
|---|---|---|---|
| view axis | all axes | x/y | z |
| Axis-aligned $64^3$ | 235 | 78 | 194 |
| View-aligned $64^3$ | 240 | 80 | 83 |
| Axis-aligned $128^3$ | 127 | 32 | 42 |
| View-aligned $128^3$ | 126 | 32 | 42 |

Tables 1 and 2 show timings for our axis-aligned and view-aligned flat texture volume renderer. The second column in both tables shows frame rates for rendering a volume stored in a 3D texture for comparison with a view port of $512^2$ pixels. The second column shows frame rates of a combined renderer showing the blending of two volumes. That is, medical data is stored in a 3D texture and a second volume is stored in flat texture. The flat texture mapping was computed arithmetically in the shader since the access to a pre-computed look-up table turn out to be a bit slower. Volumes of $64^3$ and $128^3$ voxels are considered. The test system is a Pentium 4 with 2.8 GHz. We have bench-marked the methods of the present invention on an ATI Radeon X800 XT and a NVIDIA Geforce 6800 GT. On ATI graphics hardware the rendering speed depends on the viewing direction when accessing a 3D texture. The z-axis is faster than the other two axes. Therefore we split the measurements to different axes. Although the flat texture volume rendering is slower than rendering from 3D textures, it still runs at interactive frame rates and has the advantage of visualizing the data during the iterative updates.

It has been shown that our flat texture mapping method according to an aspect of the present invention provides real-time progressive visualization of data stored in a flat texture, especially for small and mid-size volumes as they are typically used for interactive 3D algorithms, without data copying and reordering. The flat texture has the advantage of fast GPU-updates in a single rendering pass. Any GPU-accelerated algorithm working on a flat texture can be visualized using our flat texture mapping method with no additional texture memory and reordering passes.

Figure 6:
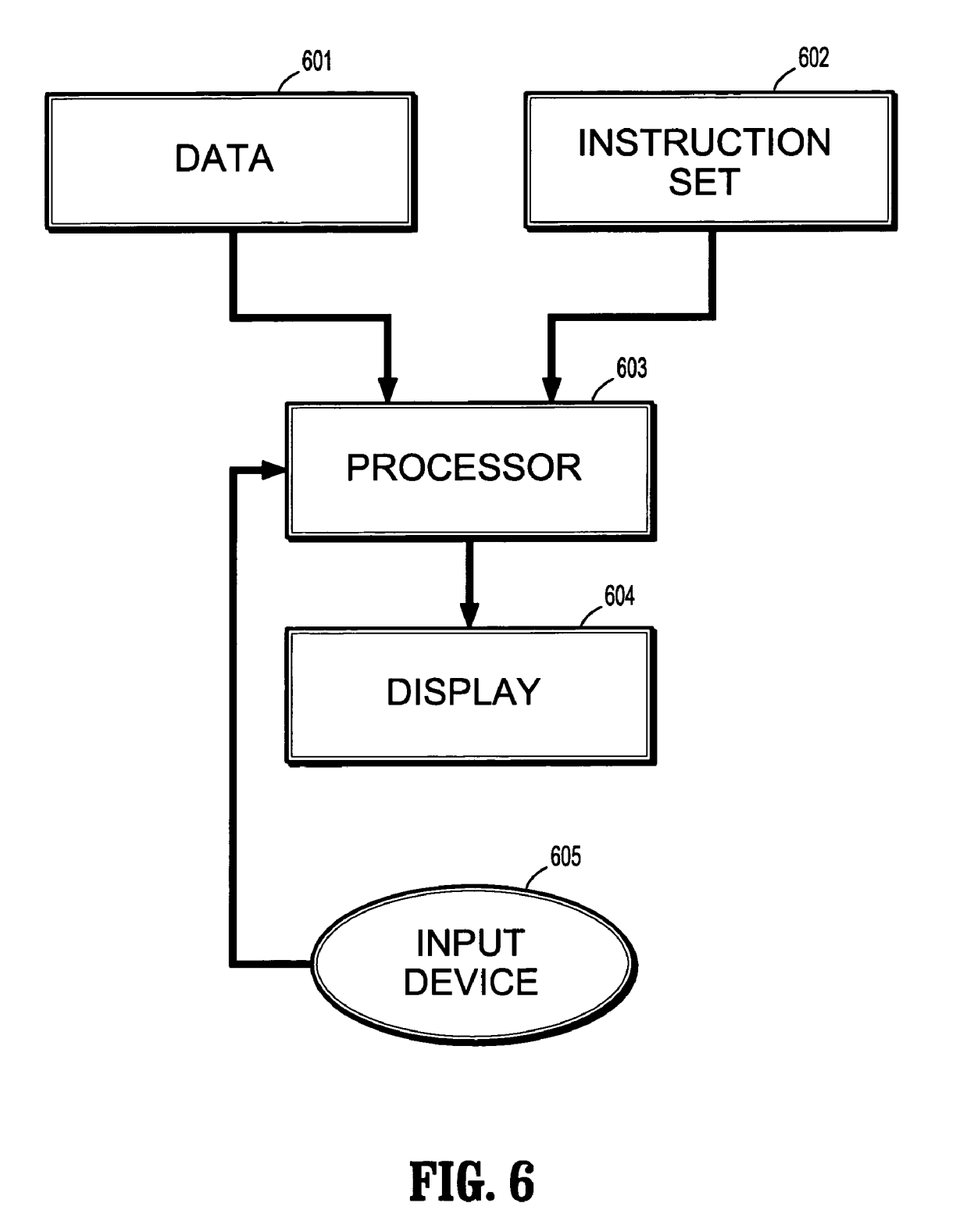
FIG. 6 illustrates a system in accordance with one aspect of the present invention.

The flat texture mapping methods that are part of the present invention can be executed by a system as shown in FIG. 6. The system is provided with data 601 representing 3D volume data. An instruction set or program 602 executing the methods of the present invention is provided and combined with the data in a processor 603, which can process the instructions of 602 applied to the data 601 and show the rendered image on a display 604. The processor can be dedicated hardware: a GPU has been specifically identified as such. However, the processor can also be a CPU or any other computing device that can execute the instructions of 602. An input device 605 like a mouse, or track-ball or other input device allows a user to select an initial object to be rendered and to start the rendering process. Consequently the system as shown in FIG. 6 provides an interactive system for object rendering from an image using flat texture mapping methods.

Any reference to the term pixel herein shall also be deemed a reference to a voxel.

The following references are generally descriptive of the background of the present invention and are hereby incorporated herein by reference: [1] Harris, M. J.: Real-time cloud simulation and rendering. Technical Report TRO3-040, University of North Carolina (2003); [2] A. E. Lefohn, J. M. Kniss, C. D. Hansen, R. T. Whitaker, Interactive Deformation and Visualization of Level Set Surfaces Using Graphics Hardware, EEE Visualization, pp. 75-82, 2003; [3] Weiskopf, D., Schafhitzel, T., Ertl, T.: Real-Time Advection and Volumetric illumination for the Visualization of 3D Unsteady Flow, Proceedings of EG/IEEE TCVG Symposium on Visualization EuroVis 2005; [4] Pharr, M., Fernando, R.: GPU Gems 2: Programming Techniques for High-Performance Graphics and General Purpose Computation. Addison-Wesley (2005); [5]Mark J. Harris, William V. Baxter, Thorsten Scheuermann, and Anselmo Lastra. Simulation of cloud dynamics on graphics hardware. In *HWWS '03: Proceedings of the ACM SIGGRAPH/EUROGRAPHICS conference on Graphics hardware*, pages 92-101, Aire-la-Ville, Switzerland, Switzerland, 2003. Eurographics Association; [6] Aaron Lefohn, Joe M. Kniss, and John D. Owens. *Implementing Efficient Parallel Parallel Structures on GPUs*, pages 521-545. Addison-Wesley, 3 2005; [7] Joe M. Kniss, Aaron Lefohn, and Nathaniel Fout. *Implementing Efficient Parallel Data Structures on GPUs*, pages 667-674. Addison-Wesley, 3 2005; [8] Jens Krueger and Ruediger Westermann: Acceleration techniques for GPU-based volume rendering. In *Proceedings IEEE Visualization* 2003, 2003; [9] R. Westermann and T. Ertl. Efficiently using graphics hardware in volume rendering applications. In ACM SIGGRAPH 1998, 1998; [10] OpenGL. framebuffer objects. http://www.opengl.org/documentation/extensions/EXT_framebuffer_object.txt While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method of processing a three dimensional (3D) image data elements including at least one object acquired by a medical imaging device and arranged in a plurality of equally sized parallel slices, comprising:

arranging successive equally sized parallel slices of three dimensional image data elements in a plurality of equally sized square 2D texture tiles, a texture tile having a plurality of texture data elements and each 2D texture tile representing a slice in the plurality of slices;

arranging the plurality of equally sized 2D texture tiles in a single flat two dimensional texture comprised of two dimensional texture data elements such that three dimensional image data from successive equally sized parallel slices are in the single flat two dimensional texture, each two dimensional texture data element in the single flat two dimensional texture being addressable by a 2-dimensional address related to the single flat two dimensional texture;

with a processor, addressing in accordance with a first addressing scheme a plurality of 3D image data elements in the single flat two dimensional texture and generating 2-dimensional addresses for the plurality of 3D image data elements in an order based on a first direction of viewing the three dimensional image data, wherein a non-axis aligned direction of viewing is allowed without changing the single flat two dimensional texture and rendering a first image that represents a slice through the at least one object that is based on the first direction of viewing from 3D image data elements included in at least two of the plurality of slices represented in the single flat two dimensional texture based on the first direction of viewing; and with the processor, addressing in accordance with a second addressing scheme the plurality of 3D image data elements in the single flat two dimensional texture and generating 2-dimensional addresses for the plurality of 3D image data elements in an order based on a second direction of viewing the three dimensional image data, wherein a non-axis aligned direction of viewing is allowed without changing the single flat two dimensional texture and rendering a second image from the single flat two dimensional texture based on the second direction of viewing.

2. The method of claim 1, wherein the step of addressing and rendering are performed at the same time.

3. The method of claim 1, wherein the steps of addressing and rendering are performed at different times.

4. The method of claim 1, wherein the steps of addressing and rendering are performed in a graphics processing unit.

5. The method of claim 4, wherein a pixel shader in the graphics processing unit is used to perform the steps of addressing and rendering.

6. The method of claim 1, wherein the first addressing scheme of the 3D image data elements in the single flat two dimensional texture is used when viewing the three dimensional image data from a x direction, a second addressing scheme of the 3D image data elements in the single flat two dimensional texture is used when viewing the three dimensional image data from a y direction and a third addressing scheme of the 3D image data elements in the single flat two dimensional texture is used when viewing the three dimensional image data from a z direction, where x, y, and z refer to the axes of Cartesian coordinate system.

7. The method of claim 6, wherein:

when viewing from the x direction, a slice is reconstructed by reading data elements of a column of the single flat two dimensional texture and the column index is determined by a u-component of 3D coordinates (u,v,w);

when viewing from the y direction, a slice is reconstructed by reading data elements of a row of the single flat two dimensional texture and the row index is determined by the v-component of 3D coordinates (u,v,w); and when viewing from the z direction, a slice is reconstructed from the single flat two dimensional texture directly by (u,v).

8. A system of processing a set of three dimensional image data related to at least one object arranged in a plurality of slices, comprising:
a processor;
software operable on the processor to:
arrange the set of three dimensional image data in a plurality of equally sized square parallel slices;
arrange successive ones of the plurality of equally sized square parallel slices in a single flat two dimensional texture of a plurality of equally sized square 2D texture tiles in accordance with Cartesian axes, wherein each of the plurality of equally sized square parallel slices is mapped into one square 2D texture tile, a texture tile having a plurality of 3D image data elements and each 2D texture tile representing a slice in the plurality of equally sized square parallel slices;
address a set of 3D image data elements by applying to each 3D image data element in the set of 3D image data elements in the single flat two dimensional texture a first set of two dimensional addresses in an order based on a first viewing direction using a first addressing scheme, wherein a non-axis aligned viewing direction is allowed without changing the flat two dimensional texture;
render a first image from the single flat two dimensional texture that represents a slice through the at least one object that is based on the non-axis aligned viewing direction using the results of the addressing step based on the first viewing direction and wherein the first image contains 3D image data elements included in at least two of the plurality of slices represented in the single flat two dimensional texture; and
address the set of 3D image data elements by applying to each 3D image data element in the set of 3D image data elements in the single flat two dimensional texture a second set of two dimensional addresses in an order based on a second viewing direction using a second addressing scheme, wherein a non-axis aligned viewing direction is allowed without changing the flat two dimensional texture; and
render a second image from the set of 3D image data elements using the results of the addressing step based on the second viewing direction.

9. The system of claim 8, wherein the step of addressing and rendering are performed at the same time.

10. The system of claim 8, wherein the steps of addressing and rendering are performed at different times.

11. The system of claim 8, wherein the processor is a graphics processing unit.

12. The system of claim 11, wherein a pixel shader in the graphics processing unit is used to perform the steps of addressing and rendering.

13. The system of claim 8, wherein the first addressing scheme is used when viewing from x direction, a second addressing scheme is used when viewing from a y direction and a third addressing scheme is used when viewing from a z direction, wherein x, y, and z refer to the axes of Cartesian coordinate system.

14. The system of claim 13 wherein:
when viewing from the x direction, a slice is reconstructed by reading 3D image data elements of a column of the single flat two dimensional texture and the column index is determined by a u-component of 3D coordinates (u,v,w);
when viewing from the y direction, a slice is reconstructed by reading 3D image data elements of a row of the single flat two dimensional texture and the row index is determined by the v-component of 3D coordinates (u,v,w); and
when viewing from the z direction, a slice is reconstructed from the single flat two dimensional texture directly by (u,v).

15. A method of processing three dimensional image data representing at least one object, comprising:
acquiring the three dimensional image data with a medical imaging apparatus;
arranging the three dimensional image data in a plurality of equally sized square parallel slices;
arranging successive ones of the plurality of equally sized square parallel slices in a single flat two dimensional texture comprised of equally sized 2D texture tiles, wherein each three dimensional image data element has a two dimensional address in the single flat two dimensional texture;
addressing the three dimensional image data elements in the single flat two dimensional texture with a first set of two dimensional addresses in an order based on a first viewing direction of the set of image data using a first addressing scheme wherein a non-axis aligned viewing direction is allowed;
calculating view aligned slices in the first viewing direction from the single flat two dimensional texture using the results of the addressing step; and
generating by a processor of an image that represents a slice through the at least one object that is based on the non-axis aligned viewing direction to a display based on the first viewing direction;
addressing the three dimensional image data elements in the single flat two dimensional texture with a first set of two dimensional addresses in an order based on a second viewing direction of the set of image data using a second addressing scheme wherein a non-axis aligned viewing direction is allowed;
calculating view aligned slices in the viewing direction from the single flat two dimensional texture using the results of the addressing step; and
generating by the processor of an image to a display based on the first viewing direction.

16. The method of claim 15, wherein the steps are performed in a graphics processing unit.

17. The method of claim 16, wherein a pixel shader in the graphics processing unit is used to perform the steps of addressing and rendering.

18. A method of processing a set of three dimensional image data elements representing an object, comprising:
arrange the set of three dimensional image data elements in a single flat two dimensional texture comprised of equally sized 2D texture tiles, wherein each three dimensional image data element has a two dimensional address;
addressing a plurality of three dimensional image data elements in the single flat two dimensional texture with two dimensional addresses in an order based on a first viewing direction of the set of image data including determining an address of a data element in the single flat two dimensional texture inside the object that identifies a position of the data element in a view aligned slice wherein a non-axis aligned viewing direction is allowed using a first addressing scheme; and
rendering by a processor of first image on a display from the plurality of three dimensional image data elements in the single flat two dimensional texture from the first viewing direction using ray casting;

addressing the plurality of three dimensional image data elements in the single flat two dimensional texture with two dimensional addresses in an order based on a second viewing direction of the set of image data including determining an address of a data element in the single flat two dimensional texture inside the object that identifies a position of the data element in a view aligned slice wherein a non-axis aligned viewing direction is allowed using a second addressing scheme; and rendering by a processor of second image on a display from the plurality of three dimensional image data elements in the single flat two dimensional texture from the second viewing direction using ray casting.

19. The method of claim 18, wherein the steps are performed in a graphics processing unit.

20. The method of claim 18, wherein a pixel shader in the graphics processing unit is used to perform the steps of addressing and rendering.

21. The method of claim 18, wherein an addressing scheme that converts three dimensional coordinates into two dimensional flat texture coordinates is used.

* * * * *